United States Patent
Aiuppa

[15] 3,662,657
[45] May 16, 1972

[54] TURF ROLLER FOR TRACTOR

[72] Inventor: Francesco Aiuppa, 58286 Hill & Dale Drive, Muskego, Wis. 53150

[22] Filed: July 9, 1970

[21] Appl. No.: 53,403

[52] U.S. Cl. ................................................94/50 R, 301/39
[51] Int. Cl. ....................................................E01c 19/26
[58] Field of Search ..........................94/50; 301/39, 40, 41

[56] References Cited

UNITED STATES PATENTS

| 3,298,292 | 1/1967 | Wylie | 94/50 |
| 2,664,683 | 1/1954 | De Cato | 94/50 |
| 1,752,682 | 4/1930 | McConnell | 94/50 X |

FOREIGN PATENTS OR APPLICATIONS

| 1,476,400 | 2/1967 | France | 94/50 |

*Primary Examiner*—Jacob L. Nackenoff
*Attorney*—Wheeler, House & Wheeler

[57] ABSTRACT

Disclosed herein is a turf roller adapted to be connected to the wheel hub of a vehicle such as a tractor and used as both a driving wheel and a roller. The roller includes inner and outer concentric cylindrical walls and end walls which connect the outer and inner walls to define a concentric water chamber and an axial passage adapted to receive the wheel hub of a vehicle. A bracket or partition located in the axial passage and spaced intermediate its length is provided with a plurality of apertures for receiving the hub studs. Nuts are threaded on the studs to secure the partition to the hub. Access to the nuts is afforded by the axial passage.

3 Claims, 3 Drawing Figures

PATENTED MAY 16 1972

3,662,657

Inventor
Francesco Ciuppa
By
Wheeler, Wheeler, House & Clemency
Attorneys 3,662,657

TURF ROLLER FOR TRACTOR

BACKGROUND OF INVENTION

The invention relates to an attachment for tractors and more particularly to a turf rolling apparatus which replaces the wheels of the vehicle. Prior art apparatus such as that disclosed in the U.S. Pat. to DeCato, No. 2,664,683, utilizes a frame which rotatably supports two rollers having water compartments and compartments which frictionally receive the vehicle wheels. The frame is fastened to the vehicle. Apparatus of this nature has proved cumbersome and adaptable to only one particular size tractor or vehicle.

SUMMARY OF INVENTION

The invention provides turf rolling apparatus which can be used on any tractor or vehicle having a standard wheel hub and studs. The roller has concentric outer and inner walls secured by spaced end walls to define a concentric water chamber surrounding an axial passage which receives the wheel hub of the vehicle. The water chamber provides additional weight to the roller in addition to the vehicle weight and the weight of the rider or tractor operator. A bracket or partition in the passage located intermediate the end walls is provided with apertures for receiving the wheel studs. The axial passage permits tightening of nuts on the wheel studs. The outer end wall can be inwardly concave to facilitate filling of the water chamber. The inner end wall is desirably outwardly convex to provide clearance with the vehicle.

It is an object of the invention to provide a universal turf roller for a vehicle which is adapted to be bolted to the axle hub and which includes a concentric water chamber which surrounds an axial passage which affords access to the studs on the wheel hub.

Further objects and advantages of the present invention will become apparent from the following disclosure.

DRAWINGS

DESCRIPTION OF PREFERRED EMBODIMENTS

Figure 1:
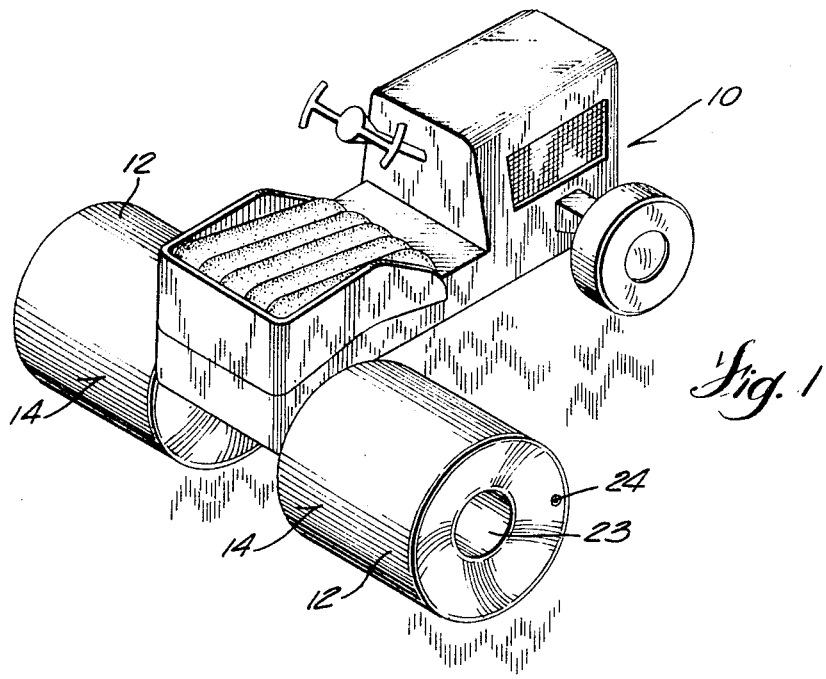
FIG. 1 is a perspective view of a tractor embodying the turf roller of the invention.
Figure 2:
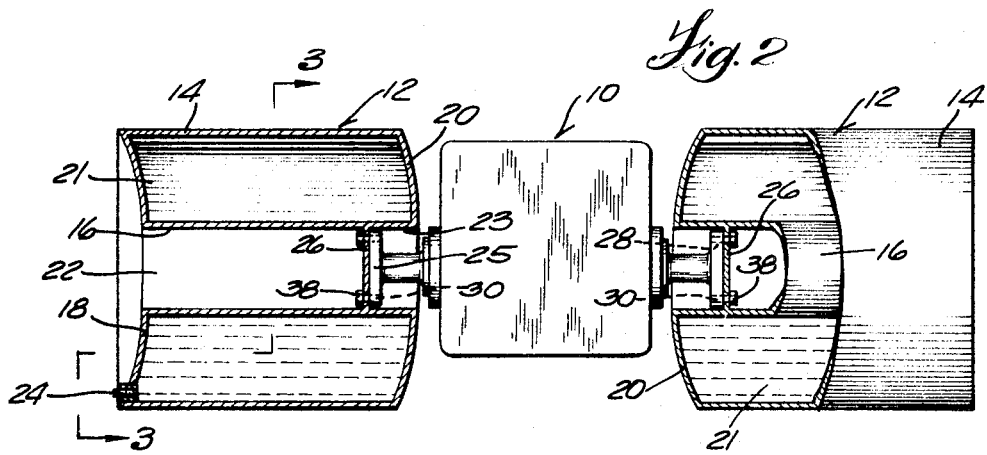
FIG. 2 is an end view in fragmentary section with portions broken away showing the turf rollers of FIG. 1.
Figure 3:
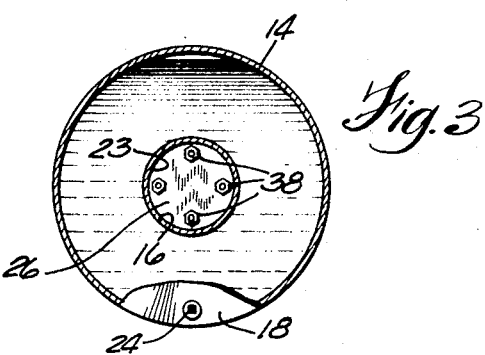
FIG. 3 is a sectional end view taken along line 3—3 of FIG. 2.

In the drawings, there is shown a tractor 10 embodying right and left turf rollers 12 in accordance with the invention. Each of the turf rollers 12 includes a cylindrical outer wall 14 and a concentric cylindrical inner wall 16 located interiorly of the outer wall 14. End walls 18 and 20 are welded or otherwise secured to the edges of the cylindrical walls 14 and 16 to define a concentric water chamber 21 which surrounds an axial passage 22. The end walls 18 and 20 have concentric axial apertures 23 having the same diameter as the passage 22.

The outer end wall 18 is desirably inwardly concave to facilitate filling of a water chamber inlet 24 which is located in the end wall 18. The inner end wall 20 is desirably outwardly convex to provide clearance with the tractor 10.

The axial passage 22 has a diameter sufficient to receive the brake drum (not shown) and the wheel hub 25 of the tractor.

Means are provided for securing the roller 12 to the wheel hub 25. As disclosed, the means comprises a bracket or partition 26 which is secured to the inner wall 16 and located intermediate the end walls. The bracket 26 is provided with a plurality of apertures 28 adapted to receive the studs 30 projecting laterally from the wheel hubs 25. Nuts 38 clamp the brackets 26 to the hubs 25.

The location of the brackets 26 intermediate the end walls 18 and 20 permits the rollers 12 to be located close to the tractor 10. The axial passage 22 permits a socket wrench and wrench extention to be used to tighten the nuts 38.

The rollers 12 are desirably constructed of stainless steel to afford strength and to prevent corrosion.

Various features of the invention are set forth in the following claims.

I claim:

1. The combination of a tractor having co-axial wheel axles with wheel hubs having wheel lugs for detachably connecting driving wheels, and a roller for rolling turf and for supporting the tractor and for propelling the tractor along the ground, said roller including a cylindrical concentric outer wall, a concentric inner wall spaced from said outer wall and located interiorly from said outer wall, spaced end walls having concentric axial apertures and interconnecting said outer and inner walls to form a concentric water chamber, around an axial open ended passage, and a partition located within said axial passage intermediate said end walls and intermediate the length of said axial open ended passage and connected to said concentric inner wall and said partition being provided with spaced apertures receiving said lugs and nuts on said lugs securing said roller to said wheel hub.

2. The combination of claim 1 wherein said outer end wall is inwardly concave and a water inlet in said concave end wall.

3. The combination of a tractor having co-axial wheel axles with wheel hubs having wheel lugs for detachably connecting driving wheels, and a roller for rolling turf and for supporting the tractor and for propelling the tractor along the ground, said roller including a cylindrical concentric outer wall, a concentric inner wall spaced from said outer wall and located interiorly from said outer wall, spaced end walls having concentric axial apertures and interconnecting said outer and inner walls to form a concentric water chamber, around an axial open ended passage and wherein said inner and outer cylindrical walls have inner ends and said inner end of said outer wall is located laterally outwardly of said inner cylindrical wall end and wherein said inner end wall adjacent said tractor is axially convex to provide clearance of said cylindrical outer wall with said tractor and a partition located within said axial passage intermediate said end walls and intermediate the length of said axial open ended passage and connected to said concentric inner wall and said partition being provided with spaced apertures, receiving said lugs and nuts on said lugs securing said roller to said wheel hub.

* * * * *